US010787206B2

(12) United States Patent
Nagano et al.

(10) Patent No.: US 10,787,206 B2
(45) Date of Patent: Sep. 29, 2020

(54) FLOOR UNDERCOVER AND ELECTRIC VEHICLE EQUIPPED WITH THE FLOOR UNDERCOVER

(71) Applicant: TOYOTA JIDOSHA KABUSHIKI KAISHA, Toyota-shi, Aichi-ken (JP)

(72) Inventors: Koyo Nagano, Toyota (JP); Ryosuke Fukui, Aichi-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/290,291

(22) Filed: Mar. 1, 2019

(65) Prior Publication Data

US 2019/0291785 A1 Sep. 26, 2019

(30) Foreign Application Priority Data

Mar. 20, 2018 (JP) ................................ 2018-051911

(51) Int. Cl.

| | |
|---|---|
| ***B62D 25/20*** | (2006.01) |
| ***B62D 21/15*** | (2006.01) |
| ***B60K 1/04*** | (2019.01) |
| ***B62D 35/02*** | (2006.01) |

(52) U.S. Cl.

CPC ................ *B62D 25/20* (2013.01); *B60K 1/04* (2013.01); *B62D 21/155* (2013.01); *B62D 35/02* (2013.01); *B60K 2001/0438* (2013.01)

(58) Field of Classification Search

CPC ...... B62D 25/20; B62D 21/155; B62D 35/02; B60K 1/04

USPC .............................................. 296/180.1, 204

See application file for complete search history.

(56) References Cited

U.S. PATENT DOCUMENTS

2003/0214153 A1* 11/2003 Kanie .................. B62D 29/048 296/193.07
2013/0026790 A1* 1/2013 Kakiuchi ............... B62D 35/02 296/193.07
2015/0336615 A1* 11/2015 Lim ..................... B62D 35/005 296/187.09

FOREIGN PATENT DOCUMENTS

JP 2016-199198 A 12/2016

* cited by examiner

*Primary Examiner* — Joseph D. Pape
(74) *Attorney, Agent, or Firm* — Oliff PLC

(57) ABSTRACT

There is provided a floor undercover including: a flat plate portion that covers a bottom portion of a cabin located at a lower position than a front suspension member; side wall portions that rise in a vehicle upward direction from vehicle width direction outer end portions of the flat plate portion and that extend in a vehicle front and rear direction; and a curved portion that rises from a vehicle front-side edge portion of the flat plate portion toward the front suspension member, that curves from the vehicle width direction to a vehicle rearward direction heading outward in the vehicle width direction, and that is connected to the side wall portions.

6 Claims, 3 Drawing Sheets

FR
RH LH
10 40 40A 14 42 44 16 21 28F 28 28M 23 58 27 26 12F 12 12M 24 22 18 50 30 32 20M 20F 20 18L

FR
RH
LH
10
40
40A
14
42
44
16
21
28F
28
23
28M
58
27
26
12F
12
24
12M
22
18
50
30
32
20M
20F
18L
20

10
44
42
40A
40
21
12M
12
12F
30
18
18L
20F
20
20M
32
28F
28M
28
27
24
26
22
50
58
UP
FR
RH

FLOOR UNDERCOVER AND ELECTRIC VEHICLE EQUIPPED WITH THE FLOOR UNDERCOVER

CROSS-REFERENCE TO RELATED APPLICATION

This application is based on and claims priority under 35 USC 119 from Japanese Patent Application No. 2018-51911 filed on Mar. 20, 2018, the disclosure of which is incorporated by reference herein.

BACKGROUND

Technical Field

The present disclosure relates to a floor undercover and an electric vehicle equipped with the floor undercover.

Related Art

Japanese Patent Application Laid-open (JP-A) No. 2016-199198 discloses a vehicle equipped with a floor undercover that covers a floor excluding a floor tunnel. The floor undercover is formed so as to cover a floor frame that extends in the vehicle front and rear direction on the undersurface of a floor panel.

The floor undercover has a structure where a wall portion on the front end of the floor undercover is formed so as to extend substantially parallel to the vehicle width direction and where traveling air hits the wall portion and blows outward in the vehicle width direction. Consequently, in the vehicle equipped with this floor undercover, the traveling air from the vehicle front side does not flow smoothly toward the vehicle rear side, so the drag coefficient increases.

In this connection, in a vehicle where a battery unit is installed under the floor of the cabin, there are cases where the bottom portion of the cabin becomes lower than the bottom portion of a front suspension member. When a floor undercover is mounted to such a vehicle, the same problem as with the vehicle equipped with the above-described floor undercover arises. Namely, a wall portion that extends in the vehicle width direction forms at the boundary between the bottom portion of the front suspension member and the bottom portion of the cabin, so the traveling air from the vehicle front side does not flow smoothly toward the vehicle rear side and the drag coefficient increases.

SUMMARY

It is an object of the present disclosure to provide a floor undercover that can inhibit an increase in the drag coefficient in a case where the floor undercover is mounted to a bottom portion of a cabin located at a lower position than a front suspension member.

A floor undercover of a first aspect includes: a flat plate portion that covers a bottom portion of a cabin located at a lower position than a front suspension member; side wall portions that rise in a vehicle upward direction from vehicle width direction outer end portions of the flat plate portion and that extend in a vehicle front and rear direction; and a curved portion that rises from a vehicle front-side edge portion of the flat plate portion toward the front suspension member, that curves from the vehicle width direction to a vehicle rearward direction heading outward in the vehicle width direction, and that is connected to the side wall portions.

The floor undercover of the first aspect is applied to a vehicle in which the bottom portion of the cabin is located at a lower position than the bottom portion of the front suspension member. The floor undercover has, at the boundary between the bottom portion of the front suspension member and the bottom portion of the cabin, the curved portion that curves from the vehicle width direction to the vehicle rearward direction heading outward in the vehicle width direction. According to the floor undercover of the first aspect, traveling air from the vehicle front side can be made to flow along the curved portion from the vehicle width direction outer sides to the vehicle rear side, so an increase in the drag coefficient can be inhibited.

In a floor undercover of a second aspect, a rear end edge of the front suspension member curves from the vehicle width direction to the vehicle rearward direction heading outward in the vehicle width direction, and the curved portion is disposed along the rear end edge of the front suspension member.

In the floor undercover of the second aspect, the curved portion is disposed along the rear end edge of the front suspension member and thereby fills in the gap between the bottom portion of the front suspension member and the bottom portion of the cabin, and the front end of the curved portion is disposed more in the vehicle forward direction than the cabin. According to the floor undercover of the second aspect, the curvature of the front end of the curved portion is increased so that the traveling air can be made to flow smoothly outward in the vehicle width direction, and an increase in the drag coefficient can be inhibited.

In a floor undercover of a third aspect, the curved portion has upright surfaces that extend in a vehicle forward direction and inward in the vehicle width direction from the side wall portions and a sloping surface that is connected to the upright surfaces and that slopes in the vehicle upward direction heading in the vehicle forward direction.

The floor undercover of the third aspect has, in the curved portion in the vehicle width direction center, the sloping surface that slopes in the vehicle upward direction heading in the vehicle forward direction. According to the floor undercover of the third aspect, the traveling air from the vehicle front side can also be made to flow to the vehicle bottom portion, so an increase in the drag coefficient can be further inhibited.

In a floor undercover of a fourth aspect, connecting portions between the upright surfaces and the sloping surface are provided on a vehicle rear side between front tires and the front suspension member in the vehicle width direction.

In the floor undercover of the fourth aspect, in a case where the front tires are traveling forward, the upright surfaces are positioned on the rear sides of the tread surfaces, and in a case where the front tires are turning, the sloping surface is positioned on the rear side of the tread surface of the front tire on the vehicle inner side. According to the floor undercover of the fourth aspect, the impact angle in a case where a rock kicked up from the front tires impacts on the curved portion can be made shallower, so damage to the floor undercover is inhibited.

In a floor undercover of a fifth aspect, a cover front portion including a part of the curved portion adjacent to the front suspension member and a vehicle front end portion of the flat plate portion is made of metal, and a cover main body portion excluding the cover front portion is made of resin.

In the floor undercover of the fifth aspect, because the leading end part of the floor undercover is made of metal, strength with respect to obstacles on the road can be ensured, and because the part of the floor undercover other than the leading end is made of resin, an increase in the weight of the floor undercover can be inhibited.

The present disclosure can provide a floor undercover that can inhibit an increase in the drag coefficient in a case where the floor undercover is mounted to a bottom portion of a cabin located at a lower position than a front suspension member.

BRIEF DESCRIPTION OF THE DRAWINGS

An exemplary embodiment of the present disclosure will be described in detail based on the following figures, wherein.

DETAILED DESCRIPTION (Structure)

Figure 1:
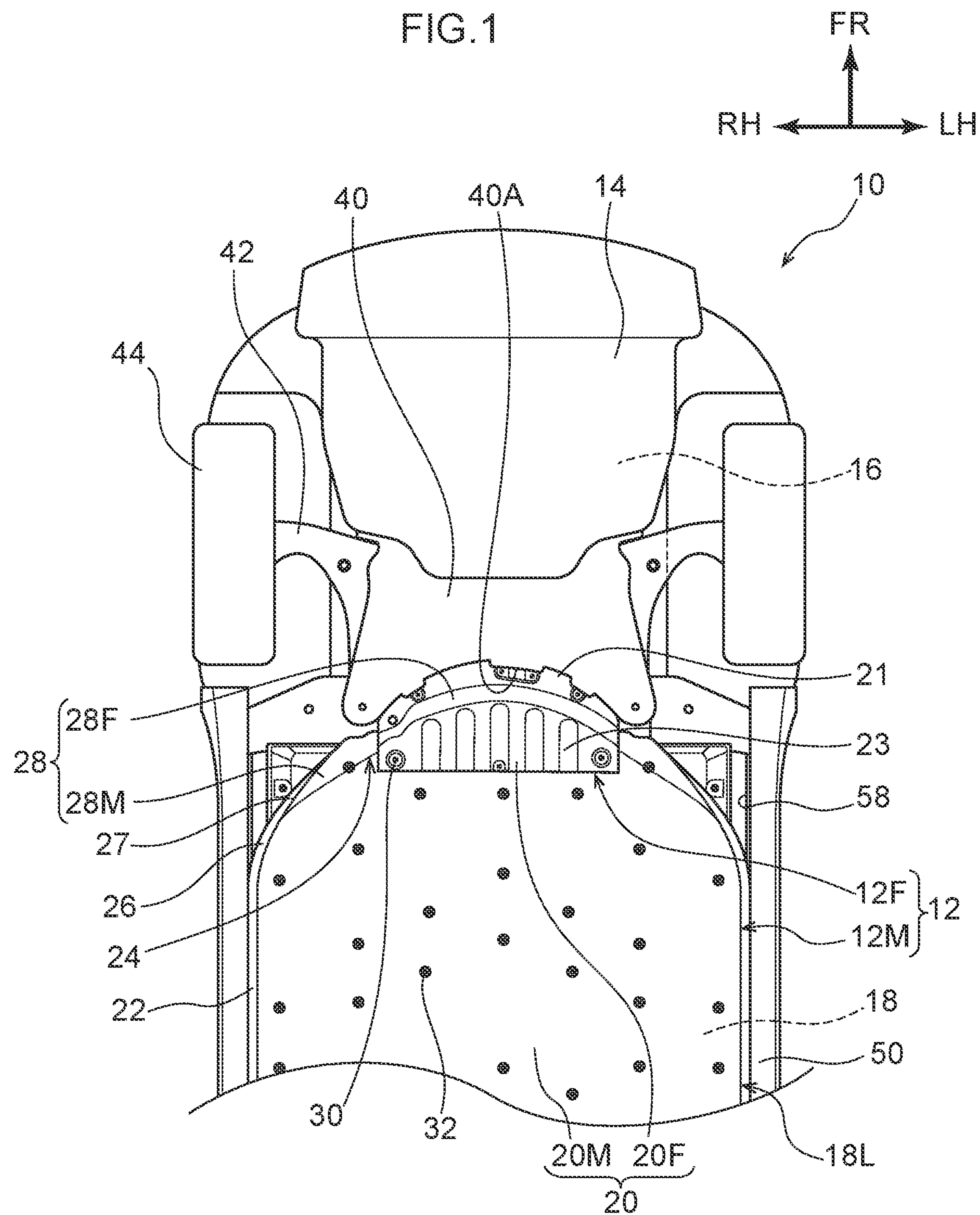
FIG. 1 is a bottom view of a floor undercover mounted to a vehicle pertaining to the embodiment.

A floor undercover 12 pertaining to an embodiment of the disclosure will be described using FIG. 1 to FIG. 3. It will be noted that arrow FR in the drawings indicates a vehicle forward direction, arrow LH indicates a leftward direction in a vehicle width direction, arrow RH indicates a rightward direction in the vehicle width direction, and arrow UP indicates a vehicle upward direction.

FIG. 1 is a bottom view of the vehicle front side of a vehicle 10 to which the floor undercover 12 of the present embodiment has been mounted. The vehicle 10 of the present embodiment is an electric vehicle that uses an electric motor as a drive unit. In the vehicle 10, the electric motor is disposed in an engine compartment 16, and a later-described battery pack 60 is disposed under the floor of a cabin 18.

The engine compartment 16 is a housing for the electric motor that is a drive unit and accessories such as an air conditioner. In the engine compartment 16 of the present embodiment, the electric motor is placed above a front suspension member 40. Furthermore, as shown in FIG. 1, the front suspension member 40 is exposed to the bottom portion of the vehicle 10. A rear end edge 40A of the front suspension member 40 curves from the vehicle width direction to the vehicle rearward direction heading outward in the vehicle width direction.

Moreover, the vehicle front side of the front suspension member 40 is covered by an engine undercover 14. Lower arms 42 are secured to the front suspension member 40 in such a way that the lower arms 42 are rotatable in the vehicle up and down direction, and front tires 14 are rotatably secured to uprights to which the lower arms 42 are connected.

Figure 3:
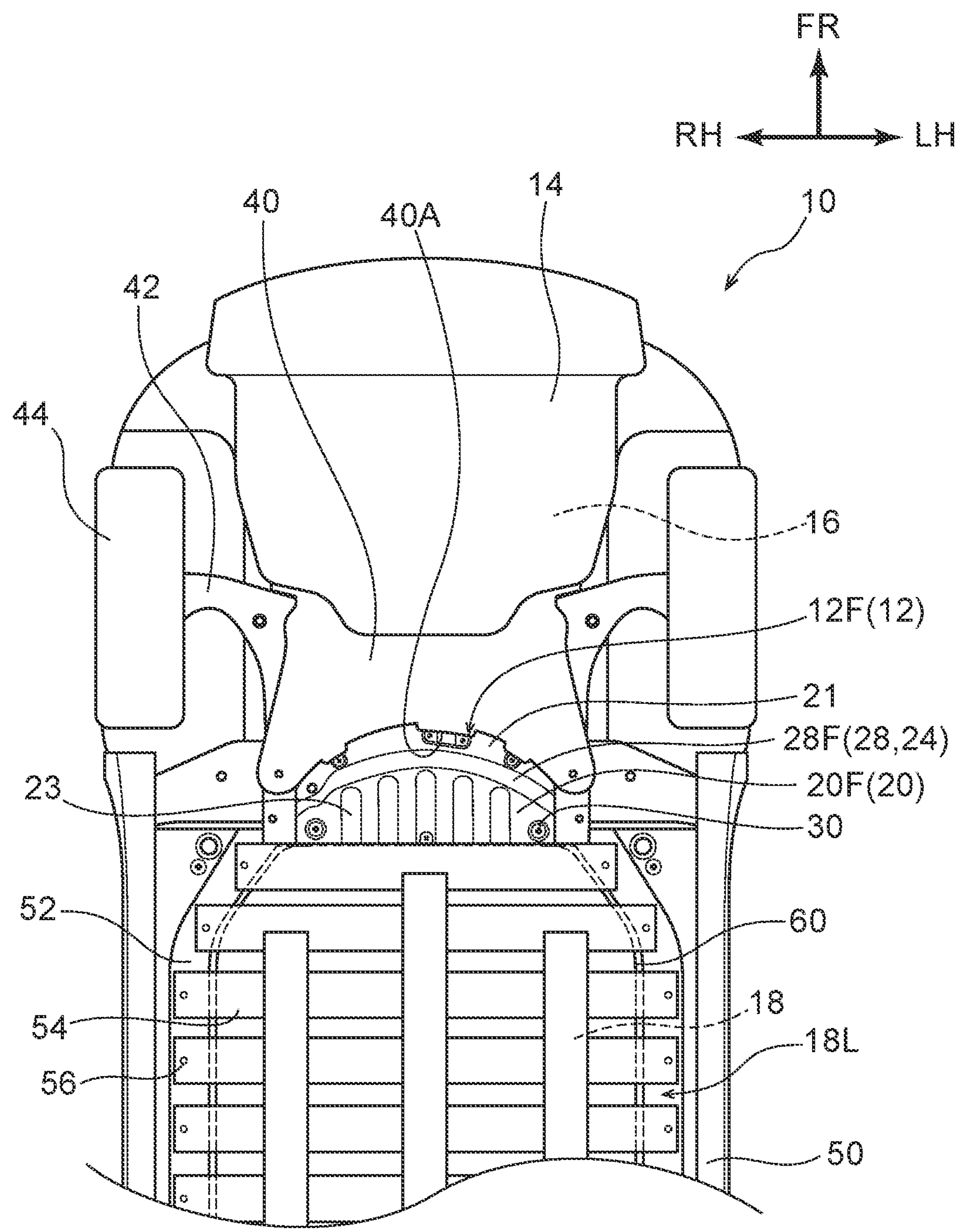
FIG. 3 is a bottom view in which the floor undercover has been removed from the vehicle pertaining to the embodiment.

In the cabin 18, which is a riding space for occupants, a battery pack 60 is housed on the vehicle lower side of a floor panel that is under the floor (see FIG. 3). Here, in the present embodiment, as shown in FIG. 3, a pair of reinforcements 52 that extend from the engine compartment 16 are provided on vehicle width direction inner sides of a pair of rockers 50 that extend along the vehicle front and rear direction. The reinforcements 52 are frame members configuring the vehicle 10, extend in the vehicle rearward direction and outward in the vehicle width direction from vehicle rear-side end portions of front side members, and, upon reaching the vicinities of the rockers 50, bend in the vehicle rearward direction and extend along the rockers 50 to the vehicle front and rear direction vehicle rear side.

The battery pack 60 is formed in a size that can be housed in the space sandwiched between the pair of reinforcements 52. More specifically, the battery pack 60 is formed substantially in the shape of an inverted "U" whose vehicle front side curves as seen in a bottom view. Furthermore, the battery pack 60 is placed on top of crossbeam-like coupling members 54. Additionally, bolts 56 inserted through holes on both vehicle width direction end sides of the coupling members 54 are fastened to female screw portions provided in the reinforcements 52, whereby the battery pack 60 is secured to the vehicle 10.

In the cabin 18 configured as described above, the coupling members 54, the reinforcements 52, and the battery pack 60 are located in a lower position than the engine undercover 14, the front suspension member 40, and the rockers 50. Additionally, in the present embodiment, the cabin 18 including the coupling members 54, the reinforcements 52, and the battery pack 60 is covered by the floor undercover 12.

As shown in FIG. 1, the floor undercover 12 of the present embodiment is configured to include a cover main body portion 12M, which covers a bottom portion 18L of the cabin 18, and a cover front portion 12F, which covers the space between the cover main body portion 12M and the front suspension member 40.

The cover main body portion 12M is a member made of resin in the shape of a rectangular frame whose vehicle front side is along the cabin 18 as seen in a bottom view. As shown in FIG. 2, plural clips 32 are inserted through holes provided in a later-described flat plate portion 20M and mate with mating holes provided in plural places in the bottom surfaces of the coupling members 54, whereby the cover main body portion 12M is secured to the vehicle 10.

The cover front portion 12F is a member made of metal in a substantially rectangular shape whose front edge side bulges in the vehicle forward direction. The cover front portion 12F is formed by stamping a steel sheet. Here, recessed portions 23 whose longitudinal direction coincides with the vehicle front and rear direction and which are recessed in the vehicle upward direction are formed in a later-described flat plate portion 20F of the cover front portion 12F.

Furthermore, in the present embodiment, plural bolts 30 are inserted through holes provided in the later-described flat plate portion 20F and are fastened to female screw portions provided in the coupling members 54. Furthermore, the plural bolts 30 are inserted through holes provided in a later-described flange portion 21 and are fastened to female screw portions provided in the front suspension member 40 or a securing member connected to the front suspension member 40. The cover front portion 12F is secured to the vehicle 10 as a result of the bolts 30 being fastened to the corresponding female screw portions. Additionally, the cover front portion 12F is secured to the vehicle 10 in a state in which the flat plate portion 20F lies on top of the cover main body portion 12M.

The structure of the floor undercover 12, in which the cover main body portion 12M and the cover front portion 12F are integrated, will be described below using FIG. 1 and FIG. 2. As described above, the floor undercover 12 of the present embodiment covers the coupling members 54, the reinforcements 52, and the battery pack 60.

Figure 2:
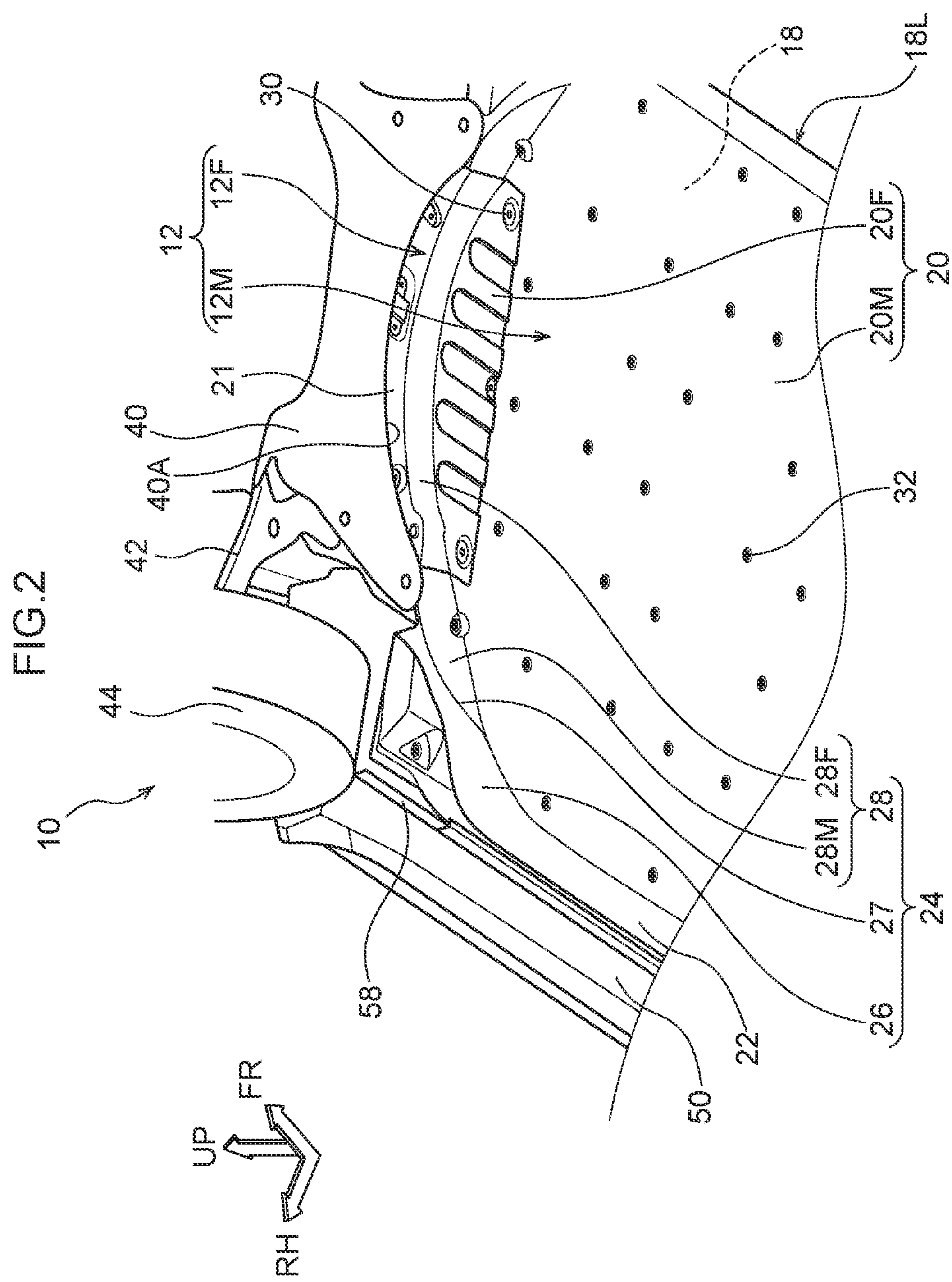
FIG. 2 is a bottom perspective view of the floor undercover mounted to the vehicle pertaining to the embodiment.

As shown in FIG. 1 and FIG. 2, the floor undercover 12 of the present embodiment is equipped with a flat plate portion 20 that covers the coupling members 54, the reinforcements 52, and the battery pack 60 located in the bottom portion 18L of the cabin 18. Here, the flat plate portion 20 has a flat plate portion 20M of the cover main body portion 12M and a flat plate portion 20F of the cover front portion 12F. In the present embodiment, the flat plate portion 20F of the cover front portion 12F is placed on top of the flat plate portion 20M of the cover main body portion 12M. It will be noted that the part of the flat plate portion 20M coinciding with the flat plate portion 20F is recessed an amount corresponding to the plate thickness of the cover front portion 12F. Consequently, a step is not formed between the flat plate portion 20F and the flat plate portion 20M, and the flat plate portion 20 is substantially flat except for the portions where the clips 32 are secured and the recessed portions 23.

Furthermore, the floor undercover 12 is equipped with side wall portions 22 that rise in the vehicle upward direction from the vehicle width direction end portions of the flat plate portion 20 and extend in the vehicle front and rear direction. The side wall portions 22 are provided only on the cover main body portion 12M.

Moreover, the floor undercover 12 is equipped with a curved portion 24 that rises from the vehicle front-side edge portion of the flat plate portion 20 toward the front suspension member 40, curves from the vehicle width direction to the vehicle front and rear direction vehicle rear side heading outward in the vehicle width direction, and is connected to the side wall portions 22. More specifically, the curved portion 24 curves in such a way as to gently trace an arc from its vehicle width direction center toward its vehicle width direction outer end portions as seen in a bottom view. The curved portion 24 has upright surfaces 26, which are surfaces that extend in the vehicle forward direction and inward in the vehicle width direction from the side wall portions 22 and point in the vehicle up and down direction, and a sloping surface 28, which is connected to the upright surfaces 26 and slopes in the vehicle upward direction heading in the vehicle forward direction. The sloping surface 28 has a sloping surface 28M of the cover main body portion 12M and a sloping surface 28F of the cover front portion 12F.

Here, connecting portions 27 having a dihedral angle resulting from two surfaces are formed in connecting parts between the upright surfaces 26 and the sloping surface 28M. The connecting portions 27 are provided between the front tires 44 and the front suspension member 40 in the vehicle width direction and on the vehicle rear sides of the lower arms 42 in the vehicle front and rear direction (see FIG. 1).

The sloping surface 28F is formed along the rear end edge 40A of the front suspension member 40. In other words, the curved portion 24 of the cover front portion 12F is disposed along the rear end edge 40A of the front suspension member 40. Here, the part of the cover front portion 12F that coincides with the front suspension member 40 is formed as a flange portion 21 that extends in the vehicle forward direction from the sloping surface 28F and is substantially parallel to the flat plate portion 20F.

Actions and Effects

The floor undercover 12 of the present embodiment is applied to the vehicle 10 in which the bottom portion 18L of the cabin 18 is located at a lower position than the bottom portion of the front suspension member 40. The floor undercover 12 has, at the boundary between the bottom portion of the front suspension member 40 and the bottom portion 18L of the cabin 18, the curved portion 24 that curves from the vehicle width direction to the vehicle rearward direction heading outward in the vehicle width direction. The curved portion 24 curves in such a way as to gently trace an arc from its vehicle width direction center toward its vehicle width direction outer end portions as seen in a bottom view.

According to the floor undercover 12 of the present embodiment, when traveling air from the vehicle front side hits the sloping surface 28F of the leading end portion of the curved portion 24, some of the traveling air flows along the curved portion 24. Namely, the traveling air flows along the sloping surface 28F, the sloping surface 28M, and the upright surfaces 26. Additionally, the traveling air flowing along the curved portion 24 flows from the upright surfaces 26 along the side wall portions 22 to the vehicle rear side, without blowing outward in the vehicle width direction, because of the Coandă effect. According to the present embodiment, the traveling air from the vehicle front side flows smoothly along the curved portion 24 toward the vehicle rear side, so an increase in the drag coefficient can be inhibited.

In the floor undercover 12 of the present embodiment, the curved portion 24 is disposed along the rear end edge 40A of the front suspension member 40 and thereby fills in the gap between the bottom portion of the front suspension member 40 and the bottom portion 18L of the cabin 18, and the front end of the curved portion 24 is disposed more in the vehicle forward direction than the cabin 18. According to the floor undercover 12 of the present embodiment, the front end of the curved portion 24 is positioned more in the vehicle forward direction than the cabin 18, so the curvature of the front end of the curved portion 24 can be increased. Because of this, the traveling air flowing from the front suspension member 40 can be made to flow smoothly outward in the vehicle width direction, and an increase in the drag coefficient can be inhibited.

It will be noted that in the present embodiment the rear ends of the curved portion 24 are positioned more in the vehicle rearward direction than the front ends of the rockers 50, so on the vehicle width direction outer sides of the curved portion 24 the floor undercover 12 is not present on the vehicle lower sides of the rockers 50. For this reason, the places of the rockers 50 corresponding to the vehicle width direction outer sides of the curved portion 24 are suitable as jack-up points 58.

Furthermore, in the vehicle 10 of the present embodiment, plural wires extend from the vehicle front side of the battery pack 60 toward the engine compartment 16. Namely, according to the floor undercover 12 of the present embodiment, the wires extending from the battery pack 60 can be protected from obstacles on the road.

In the floor undercover 12 of the present embodiment, the curved portion 24 has the upright surfaces 26, which extend in the vehicle forward direction and inward in the vehicle width direction from the side wall portions 22, and the sloping surface 28, which is connected to the upright surfaces 26 and slopes in the vehicle upward direction heading in the vehicle forward direction. According to the floor undercover 12 of the present embodiment, the floor undercover 12 has, in the curved portion 24 in the vehicle width direction center, the sloping surface 28 that slopes in the vehicle upward direction heading in the vehicle forward direction, and so the traveling air from the vehicle front side can also be made to flow to the vehicle bottom portion. For that reason, an increase in the drag coefficient can be further inhibited.

In the floor undercover 12 of the present embodiment, the connecting portions 27 between the upright surfaces 26 and the sloping surface 28 (28M) are provided on the vehicle rear side between the front tires 44 and the front suspension member 40 in the vehicle width direction. In the floor undercover 12 configured in this relationship, in a case where the front tires 44 are traveling forward, the upright surfaces 26 are positioned on the rear sides of the tread surfaces, and in a case where the front tires 44 are turning, the sloping surface 28 is positioned on the rear side of the tread surface of the front tire 44 on the vehicle inner side. That is to say, according to the floor undercover 12 of the present embodiment, the impact angle in a case where a rock kicked up from the front tires 44 impacts on the curved portion 24 can be made shallower, so damage to the floor undercover 12 is inhibited.

In the floor undercover 12 of the present embodiment, the cover front portion 12F including the part of the curved portion 24 adjacent to the front suspension member 40 and the vehicle front end portion of the flat plate portion 20 is made of metal, and the cover main body portion 12M excluding the cover front portion 12F is made of resin. According to the floor undercover 12 of the present embodiment, because the cover front portion 12F on the leading end part of the floor undercover 12 is made of metal, strength with respect to obstacles on the road can be ensured, and because the cover main body portion 12M that is the part of the floor undercover 12 other than the leading end is made of resin, an increase in the weight of the floor undercover 12 can be inhibited.

NOTES

The engine compartment 16 of the present embodiment houses an electric motor as the drive unit, but the engine compartment 16 is not limited to this. For example, the engine compartment 16 may also house an internal combustion engine such as a gasoline engine or a diesel engine. Furthermore, in the case of a fuel cell vehicle or an electric vehicle that uses an in-wheel motor, the engine compartment 16 may also house just accessories. Moreover, in the case of housing the drive unit and accessories in the vehicle rear portion, a trunk may also be disposed instead of the engine compartment 16 in the vehicle front portion.

What is claimed is:

1. A floor undercover comprising:

a flat plate portion that covers a bottom portion of a cabin located at a lower position than a front suspension member;

side wall portions that rise in a vehicle upward direction from vehicle width direction outer end portions of the flat plate portion and that extend in a vehicle front and rear direction; and a curved portion that rises from a vehicle front-side edge portion of the flat plate portion toward the front suspension member, that curves from the vehicle width direction to a vehicle rearward direction heading outward in the vehicle width direction, and that is connected to the side wall portions, wherein a rear end edge of the front suspension member curves from the vehicle width direction to the vehicle rearward direction beading outward in the vehicle width direction, and the curved portion is disposed along the rear end edge of the front suspension member.

2. The floor undercover according to claim 1, wherein the curved portion has (i) upright surfaces that extend in a vehicle forward direction and inward in the vehicle width direction from the side wall portions, and (ii) a sloping surface that is connected to the upright surfaces and that slopes in the vehicle upward direction heading in the vehicle forward direction.

3. The floor undercover according to claim 2, wherein connecting portions between the upright surfaces and the sloping surface are provided on a vehicle rear side between front tires and the front suspension member in the vehicle width direction.

4. The floor undercover according to claim 1, wherein a cover front portion including a part of the curved portion adjacent to the front suspension member and a vehicle front end portion of the flat plate portion is made of metal, and a cover main body portion excluding the cover front portion is made of resin.

5. An electric vehicle comprising:

the floor undercover according to claim 1; and a battery pack covered by the floor undercover.

6. The electric vehicle according to claim 5, further comprising coupling members on which the battery pack is placed and which are secured to a pair of frame members that extend in the vehicle front and rear direction, wherein the floor undercover is secured at plural places to bottom surfaces of the coupling members.

* * * * *